May 14, 1968  G. VILLENEUVE  3,382,719
DEVICE FOR TRANSMITTING A MECHANICAL VARIABLE
THROUGH THE WALL OF AN ENCLOSURE
Filed May 8, 1967 2 Sheets-Sheet 1

INVENTOR
GEORGES VILLENEUVE
By Young & Thompson
ATTYS.

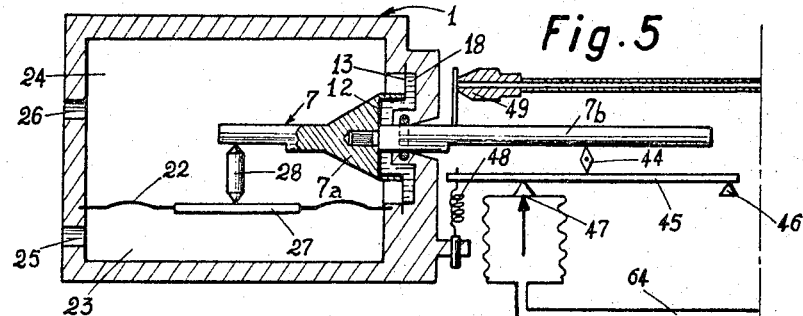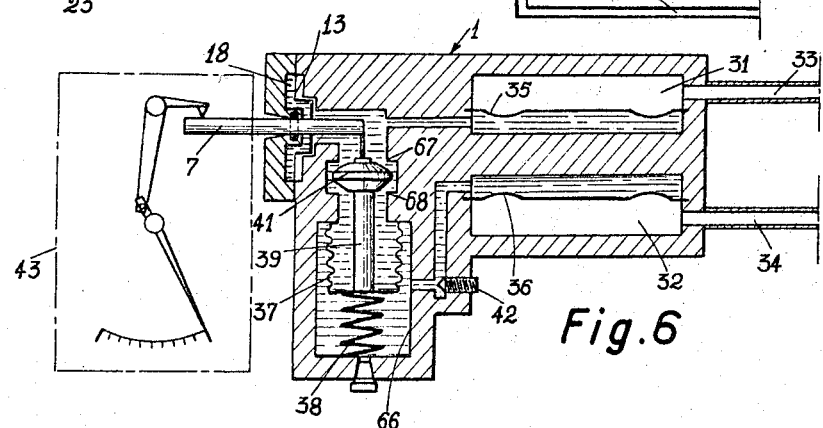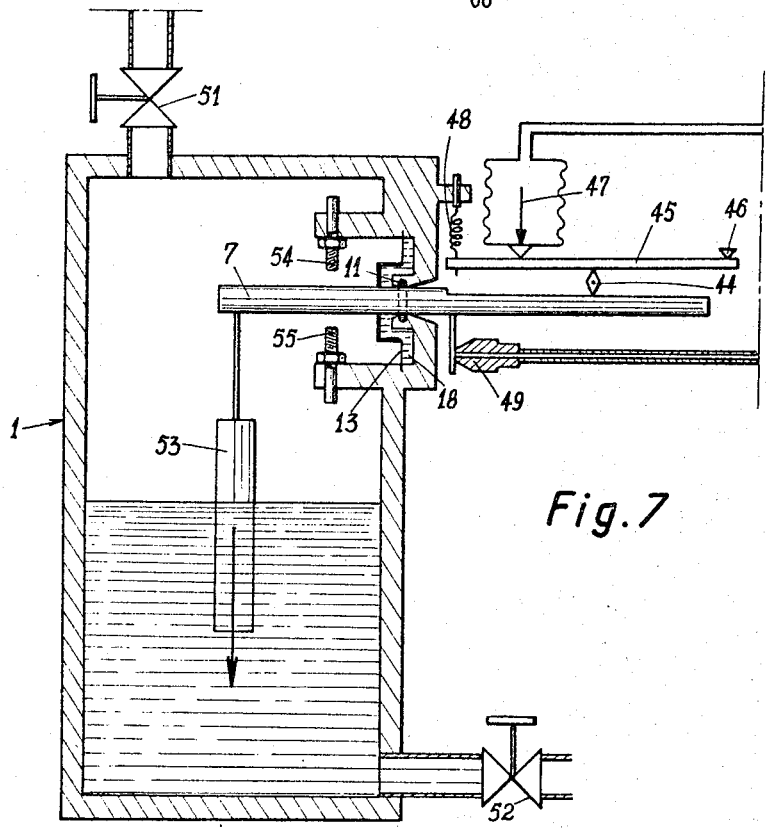

United States Patent Office 3,382,719
Patented May 14, 1968

3,382,719
DEVICE FOR TRANSMITTING A MECHANICAL VARIABLE THROUGH THE WALL OF AN ENCLOSURE
Georges Villeneuve, Palaiseau, France, assignor to Meci, Materiel Electrique de Controle et Industriel, Paris, France, a company
Filed May 8, 1967, Ser. No. 636,995
Claims priority, application France, May 11, 1966, 61,146, Patent 1,506,322
13 Claims. (Cl. 73—406)

ABSTRACT OF THE DISCLOSURE

A device whereby a mechanical variable which may be either motion or force is transmitted through the wall of a sealed enclosure by means of a flexible diaphragm mounted within the enclosure and subjected to the pressure which is developed within said enclosure. The diaphragm is adapted to carry a rigid lever which extends outside the enclosure and is supported on a hydraulic cushion located between the diaphragm and the enclosure wall, said rigid lever being adapted to traverse said wall through an opening which is fitted with a seal and which permits angular displacements of the lever.

---

This invention relates to a device whereby a mechanical variable is transmitted from the interior of a sealed enclosure to the exterior with minimum friction and maximum sensivity.

As used in this specification, the term "mechanical variable" is understood to mean either a movement or a force.

The device under consideration is particularly suitable when the pressure within the enclosure is substantially different from the outside pressure, whatever the direction of the difference.

A device of this type is of particular interest in the field of measuring instruments such as differential pressure transducers, instruments for measuring levels of liquids and, more generally, all instruments in which it proves essential to transmit a movement or a force from a pressurized cell for the purpose of indicating, recording, controlling or remote transmission of a signal which is produced within the cell.

In differential pressure transducers, level measuring instruments and other pressure-sensing and measuring instruments of known types which entail the conversion of motion or force for the purpose of transmitting the corresponding value from a sealed cell, it is common practice to carry out the motion conversion referred-to by means of an elastic member carrying a rigid moving lever which passes through the cell wall.

The elastic member must be sufficiently flexible to oppose only a very small resistance to the detector, yet sufficiently rigid to resist the difference in pressure between the interior of the cell and the exterior. The compromise solutions which have been adopted up to the present time are not without their disadvantages.

In one form of construction, for instance, the rigid lever which is subjected to a bending stress passes out of the transducer cell through a deformable metal tube which is subjected to the internal pressure of the cell; one end of this tube is welded to the transducer cell, and the other end is welded to the output lever. In the case of a tube of this type, flexibility and strength are incompatible.

In another form of construction, the rigid lever, likewise subjected to a bending stress, passes out of the transducer cell through a flexible diaphragm which ensures both the mobility of the lever and pressure-tightness of the enclosure. By reason of its very flexibility, a diaphragm of this type is always fragile.

In a third solution, the rigid lever is subjected to torque and passes out of the cell through a metal torsion tube which is subjected to the pressure of the cell. One end of this tube is welded to the transducer cell whilst the other end is welded to the output lever. In this case also, flexibility and strength of the tube remain incompatible.

The present invention is intended to overcome these disadvantages.

According to the invention, the transmission device comprises a flexible diaphragm which is housed within the enclosure, subjected to the internal pressure of the enclosure and fitted with a rigid lever projecting outside said enclosure, and is characterized in that the diaphragm is supported on a hydraulic cushion located between said diaphragm and the enclosure wall, said rigid lever being adapted to traverse said wall through an opening which is fitted with a seal and permits angular displacements of said lever.

According to an advantageous form of execution of the invention, the diaphragm is annular and is clamped at its periphery between the body and wall of the enclosure whilst the central portion of said diaphragm is welded to a rigid cup which is traversed in leak-tight manner by the transmission lever.

According to another advantageous arrangement of the invention, the transmission lever is adapted to traverse the enclosure wall through an opening constituted by two opposite flared recesses having a common central portion of minimum cross-sectional area and fitted with a flexible annular seal which surrounds the transmission lever and is mounted practically in the plane of said flexible diaphragm. To this end, it is advantageous to form the inside flared recess for the passage of the lever in a projecting portion of the wall which is directed towards the interior of the enclosure and penetrates into the cup which is integral with the transmission lever.

Further properties as well as different potential applications of the invention will become apparent from the following description, reference being had to the accompanying drawings which are given solely by way of example and not in any limiting sense, and in which:

FIG. 5 is a diagrammatic sectional view showing the application of the invention to a differential manometer;

FIG. 6 is a diagrammatic sectional view showing the application of the invention to another differential manometer;

FIG. 7 is a diagrammatic view showing the application of the invention to a plunger-type level measuring instrument.

Figure 1:
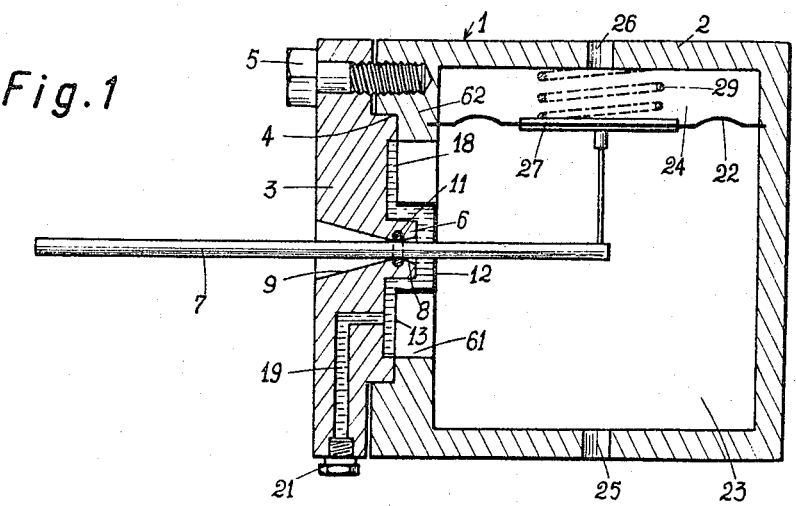
FIG. 1 is a diagrammatic axial sectional view of one embodiment of the transmission device according to the invention.
Figure 2:
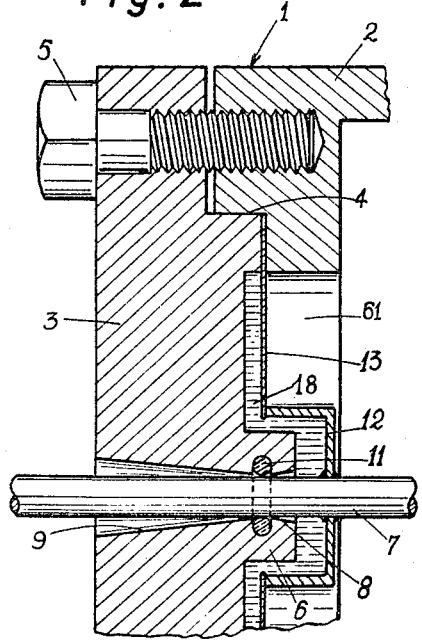
FIG. 2 is a sectional view on a larger scale showing a portion of FIG. 1.

In the particular embodiment of the invention which is contemplated in FIGS. 1 and 2 of the attached drawings, the transmission device comprises a sealed enclosure 1 composed of a hollow body 2 and a removable wall 3 which closes off an opening 61 of the body 2 and which is fitted in a circular groove 4 of said body. The wall 3 is applied against the body 2 by a ring of screws 5.

The wall 3 is traversed by a rigid transmission lever 7 mounted in such a way as to permit of angular displacement. The lever 7 is intended to transmit from the enclosure 1 a mechanical variable (motion or force) which constitutes the measurement of another variable, the lever 7 being connected to a measurement detector, various examples of which will be given hereinafter.

More precisely, the lever 7 passes through the wall 3 via an opening constituted by two opposite flared recesses 8 and 9 which form a convergent-divergent duct and define a throat, there being fitted in said throat a flexible annular seal 11 which grips the lever 7 elastically.

The lever 7 passes axially through and is supported by a rigid, cylindrical cup 12 to which it is rigidly and hermetically fixed by welding.

The cup 12 is adapted to fit with suitable play over the annular boss 6 and is secured at its periphery to a flexible and elastic annular diaphragm 13 which is usually formed of metal. The diaphragm 13 is covered at its periphery with a sealing compound and is clamped between the wall 3 and the annular shoulder 62 of the body 2 which surrounds the opening 61, clamping action being provided by the screws 5.

The result of the arrangement thus adopted is that the annular seal 11 is placed inside the annular boss 6 and substantially in the plane of flexible diaphragm 13.

According to one of the essential features of the invention, the enclosed space which is reserved on the one hand between the flexible diaphragm 13 and the cup 12 and, on the other hand, between the wall 3 of the enclosure and its annular boss 6, is filled with a liquid 18 such as an oil so as to constitute an hydraulic cushion. To this end, this space communicates with the exterior of the enclosure 1 by way of a filling duct 19 which is formed in the wall 3, the outer opening of said duct being fitted with a threaded plug 21 which provides a hermetic seal. Filling of the above-mentioned enclosed space with the liquid 18 is preferably performed in a vacuum.

As will be apparent, the liquid 18 may be other than oil; in particular, it would be possible to utilize an aqueous solution, a mixture of miscible liquids, mercury or any other substance which is not readily compressible and which preferably has low viscosity.

In the embodiment shown in FIGS. 1 and 2, the device according to the invention is intended to produce from the enclosure 1 a transmission of motion which corresponds to the measurement of a differential pressure.

To this end, the free end of the lever 7 may be connected to an indicator pointer, a recording pen, or the input element of a remote transmitter, a controller, a signalling device, or any other motion receiver which has not been illustrated in the drawings.

In addition, there is provided in the body 2 a sensing element consisting of a flexible diaphragm 22 which is parallel to the lever 7 and divides the body 2 into two compartments 23 and 24, each being sealed off from the other. Only the compartment 23 is in relation with the cup 12 and the membrane 13.

The compartments 23, 24 communicate respectively through apertures 25 and 26 and tubes which are not shown in the drawings with enclosures in which substantially different pressures may exist. The diaphragm 22 is clamped at its center between metal plates 27 which are connected by a rigid or semi-rigid rod 28 to the end of the transmission lever 7. The diaphragm 22 may be of steel and have the elasticity of a spring. It may be flexible and not elastic, in which case its displacement is limited by a spring 29, thereby ensuring its return to a position which depends solely on the differential pressure to which it is subjected.

The operation of the transmission device is as follows. Any difference between the pressures exerted on either side of the diaphragm 22 gives rise to a transverse displacement of said diaphragm and to a corresponding pivotal movement of the transmission lever 7. Inasmuch as said lever is supported by the cup 12 on the hydraulic cushion which is formed by the liquid 18, it is permitted to perform a free pivotal movement about its axial position within the flared recesses 8 and 9. The annular seal 11 which is mounted in the plane of the flexible diaphragm 13 virtually constitutes a fixed articulation for the lever 7.

If we designate as

P the pressure which exists within the enclosure 23,
$P_1$ the pressure which exists within the hydraulic cushion,
S the total surface area corresponding to the inset diameter of the diaphragm 13,
$s$ the transverse cross-section of the transmission lever 7, the condition of static equilibrium of the diaphragm 13 is written:

$$P_1 \times (S-s) = P \times S$$

hence, $$P_1 - P = P_1 s/S$$

$s$ being very small in relation to S, it will be seen that $P_1$ is very slightly higher than P.

The relative value of the differential pressure to which the flexible diaphragm 13 is subjected is therefore particularly low. Consequently, despite the very high pressures which may be developed in compartment 23 of the enclosure 1, the membrane 13 is not subjected to high stress and may be made of relatively thin and flexible material.

Under these conditions, during the transmission of motion, the diaphragm 13 provides only very low resistance to the detector without in any way affecting the reliability of the device.

It will be apparent that the passage of the transmission lever 7 through the wall 3 of the enclosure 1 and the mounting of the seal 11 may be carried out in a variety of ways.

Figure 3:
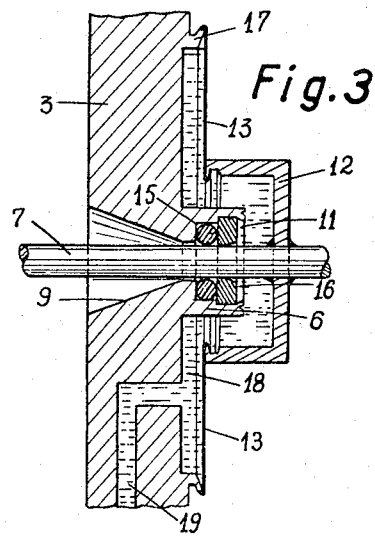
FIGS. 3 and 4 are axial sectional views on a larger scale showing two modes of execution of the exit of the transmission lever from the enclosure.

Thus, in the arrangement of FIG. 3, the seal 11 consists of a plastic ring of circular cross-section, said ring being provided with lobes or lips and placed at the bottom of a recess 15 formed in the annular boss 6. The seal 11 is held in position by a metallic retaining ring 16 which is set at the top of the annular boss 6 and forms internally the flared input recess 8 for the transmission lever 7.

In this embodiment, the edge of the flexible diaphragm 13 is no longer clamped between the body 2 and the wall 3 but crimped and welded externally to an annular flange which terminates the annular rim 17 of the enclosure wall 3. Similarly, said diaphragm is crimped and welded at its center to the internal edge of the cup 12 which forms an annular flange of similar shape to the flange mentioned above.

Figure 4:
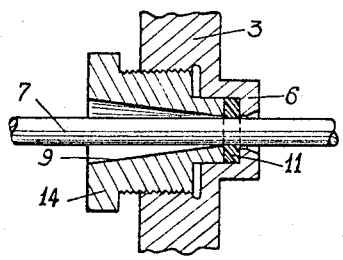

In the embodiment of FIG. 4, the seal 11 consists of a plastic ring of rectangular cross-section and is held in place by a packing-gland 14 which is screwed from the outside of the enclosure into the wall 3 and provided internally with the flared outlet recess 9 of the lever 7.

In the two arrangements last mentioned, the seal 11 can advantageously be molded directly around the lever 7, thus providing a perfect seal along said lever.

A number of advantageous applications of the transmission device according to the invention to certain industrial measuring instruments will now be described, it being understood that the invention is in no way limited to the particular applications mentioned.

In the exemplified embodiment shown in FIG. 5, the invention is directed to a differential manometer which is primarily designed to measure flows of liquid under pressure in association with depression elements. The instrument is of the force-balancing type. The rigid lever 7 which traverses the wall 3 of the enclosure 1 transmits only forces accompanied by displacements of very small amplitude.

In this example, the lever 7 is composed of two arms 7a, 7b which are force-fitted into each other. The section 7a terminates in a bell which constitutes the cup 12.

The remainder of the enclosure 1 is of similar construction to that shown in FIG. 1. Compartment 23 is normally subjected to the higher pressure. The arm 7a is subjected to the action of the differential pressure exerted on the diaphragm 22. This action is transmitted to the arm by a rigid rod 28 whose conical ends are mounted in sockets provided respectively in plate 27 and section 7a. Outside the enclosure 1, the other end of the lever 7 is supported on a force-balancing servo-mechanism by an orientable cam which is displaceable along the arm and provides a scale adjustment. Said servo-mechanism is of the pneumatic type, for example, and is provided in a known manner with an arm 45 which is supported on the one hand on a fixed point 46 and on the other hand on a bellows 47, the pressure of which is transmitted over a distance to a receiving manometer via a pipe 64 for purpose of indication, recording or control. The end of the arm 45 opposite to the fixed point 46 is subjected to the action of a variable-tension restoring spring 48 which is intended to effect the zero resetting of the instrument. Finally, the servo-mechanism referred-to comprises a deviation detector 49 which is responsive to the slightest displacement of the lever 7.

The operation is as follows: the differential pressure which is exerted on the diaphragm 22 and transmitted by the rigid lever 7 to the bellows 47 is constantly balanced by the pressure which is developed at the top of the bellows by the servo-mechanism and associated deviation detector 49, these two forces being applied in opposition at both ends of the lever 7. Moreover, said lever is intended in accordance with the invention to rest on the hydraulic cushion 18 by means of the flexible diaphragm 13.

Inasmuch as said servo-mechanism maintains a virtually null deviation at the deviation detector, the transmission lever 7 is subjected to only movements of very small amplitude, so that the flexible diaphragm 13 and the annular seal 11 are subjected to only negligible deformation. It thus becomes a simple matter to adopt dimensions in respect of thickness and diameter of the diaphragm 13 and diameter of the lever 7 which are a function of the ranges of differential pressure to be measured and also a function of the absolute value of the pressures developed.

As is readily apparent, it would not constitute a departure from the scope of the invention to substitute an electric servo-mechanism for the pneumatic instrument which is illustrated in FIG. 5.

In the embodiment shown in FIG. 6, the invention is applied to a differential manometer intended for the measurement of rates of flow of fluid under pressure, in association with depression elements such as diaphragms and venturi tubes.

The enclosure 1 comprises two compartments or chambers 31 and 32 which are at high and low pressure respectively and connected to the points of measurement by pipes 33 and 34. The compartments 31 and 32 are defined by flexible diaphragms 35 and 36 which are the detecting elements of the enclosure. Those faces of the diaphragms 35 and 36 which are located externally with respect to the compartments 31 and 32 delimit two spaces filled with oil or the like. Said spaces are bounded by the walls of the compartments themselves, and by the wall of a bellows 37 which is balanced by a spring 38 and housed in a chamber 66. The inner extremity of the transmission lever 7 is connected to the bellows 37 by a control rod 39 which is provided near its upper extremity with a valve 41. As said valve comes into contact with seats 67 or 68 at each end of its stroke, the flow of oil derived from the volume contained in compartment 31 is accordingly cut off. An adjustable needle valve 42 located in the supply line to chamber 66 makes it possible to control, within certain limits, the speed of response of the differential manometer. Outside the enclosure 1, the transmission lever 7 operates, through an amplifying system, the pointer of an indicating (or recording) instrument 43.

The operation is as follows: a differential pressure is transmitted to the bellows 37 which, for example, expands and accordingly compresses the spring 38, thereby displacing the pointer of the indicator 43 by means of the lever 7. At the end of the scale, the valve 41 comes to rest on the seat 68 and interrupts the flow of filling liquid, thus limiting the deformation of the moving parts (diaphragms 35 and 36, bellows 37, lever 7, flexible diaphragm 13 of the hydraulic cushion 18). If the differential pressure is reversed, the valve 41 performs identical functions by coming to rest on the seat 67.

The third application of the invention which is shown in FIG. 7 is concerned with a force-balancing, plunger-type instrument which is more especially intended to measure the level of a liquid within an enclosure or an element of an installation under pressure.

The sealed enclosure 1 which is provided with two supply and drainage pipes fitted with valves 51 and 52 is adapted to accommodate a plunger 53 which is suspended from the extremity of the lever 7. Two adjustable stops 54 and 55 limit the amplitude of displacement of the lever 7 which is subjected to a downward vertical force equal to the apparent weight of the plunger and variable according to the level of the liquid in which the plunger 53 is partially immersed. At the other end of the lever 7 which is located outside the compartment 1, a force which is proportional to the apparent weight of the plunger 53 is exerted by said lever on a pneumatic force-balancing servo-mechanism which is similar to that shown in FIG. 5 by means of an adjustable cam 44 (which permits of scale adjustment).

It will be understood that the effort which is proportional to the apparent weight of the plunger 53 and transmitted by the lever 7 to the bellows 47 is constantly balanced by the force which is developed at the top of the bellows by the pneumatic servo-mechanism fitted with its deviation detector.

It will be understood that the transmission device according to the invention could be applied to a large number of instruments other than those described above.

What I claim is:

1. A device for transmitting a mechanical variable (motion or force) through the wall of a sealed enclosure and comprising a flexible diaphragm housed within said enclosure, subjected to the internal pressure of the enclosure and fitted with a rigid lever projecting outside said enclosure, wherein the diaphragm is supported on a hydraulic cushion located between said diaphragm and the cell wall, said rigid lever being adapted to traverse said wall through an opening which is fitted with a seal and permits angular displacements of said lever.

2. A device as claimed in claim 1, wherein the hydraulic cushion consists of a sealed chamber which is reserved between the diaphragm and the wall of the enclosure which is located opposite to said diaphragm.

3. A device as claimed in claim 1, wherein the hydraulic cushion communicates with a filling orifice provided in the wall of the enclosure and closed off by a plug.

4. A device as claimed in claim 1, wherein the flexible diaphragm has an annular surface and is adapted to carry a central rigid cup traversed axially by the transmission lever which is integral with said cup.

5. A device as claimed in claim 4, wherein the flexible diaphragm is clamped at its periphery between the body and the wall of the sealed enclosure and welded at its center to the rigid cup.

6. A device as claimed in claim 4, wherein the seal provided for the transmission lever is disposed substantially in the plane of the flexible diaphragm within a central annular boss formed in the wall of the enclosure and adapted to project into the hydraulic cushion.

7. A device as claimed in claim 1, wherein the opening for the passage of the transmission lever has two opposite flared recesses and contains in the necked section located at the junction of said recesses a flexible annular seal which surrounds the transmission lever.

8. A device as claimed in claim 1, wherein the seal of the transmission lever is clamped within a packing gland which is mounted in the wall of the enclosure.

9. A device as claimed in claim 1, wherein the transmission lever seal is clamped by a metal ring crimped within a boss which projects into the hydraulic cushion, said ring being provided with a flared recess for the passage of the lever.

10. A device as claimed in claim 1, wherein the annular-surface flexible diaphragm is crimped and welded between two annular flanges, one flange being provided on an annular rim of the enclosure wall and the other flange being provided on a rigid cup which is traversed by the transmission lever.

11. A device as claimed in claim 1, wherein said device is applied to a differential manometer which utilizes transmission of motion.

12. A device as claimed in claim 1, wherein said device is applied to a differential manometer which utilizes transmission of force.

13. A device as claimed in claim 1, wherein said device is applied to an instrument of the plunger type which utilizes a transmission of force for the measurement of level.

References Cited

UNITED STATES PATENTS

| 3,274,833 | 9/1966 | Ollivier et al. | 73—407 |
| 3,315,528 | 4/1967 | Hickox | 73—407 |

DAVID SCHONBERG, *Primary Examiner.*

DONALD O. WOODIEL, *Examiner.*